United States Patent
Tremouilles (10) Patent No.: US 6,460,869 B1
(45) Date of Patent: Oct. 8, 2002

(54) TRANSVERSE MEMBER FOR A MOTOR VEHICLE REAR AXLE ASSEMBLY

(75) Inventor: Gilles Tremouilles, Boulogne-Billancourt (FR)

(73) Assignee: Sollac, Puteaux (FR)

( * ) Notice: Subject to any disclaimer, the term of this patent is extended or adjusted under 35 U.S.C. 154(b) by 0 days.

(21) Appl. No.: 09/377,735

(22) Filed: Aug. 19, 1999

(30) Foreign Application Priority Data

Aug. 19, 1998 (FR) .............................. 98 10557

(51) Int. Cl.$^7$ .............................................. B60G 21/05
(52) U.S. Cl. .................. 280/124.116; 280/124.128; 280/124.166
(58) Field of Search .................... 280/800, 124.128, 280/124.116, 124.166, 124.106

(56) References Cited

U.S. PATENT DOCUMENTS

| | | | | |
|---|---|---|---|---|
| 3,448,995 A | * | 6/1969 | Stallard et al. | |
| 3,572,799 A | * | 3/1971 | Truesdell et al. | ........... 293/128 |
| 3,626,872 A | * | 12/1971 | Cully | |
| 3,842,564 A | * | 10/1974 | Brown | ........... 211/123 |
| 3,843,182 A | * | 10/1974 | Walls et al. | ........... 267/140 |
| 4,040,640 A | * | 8/1977 | Begg | ........... 280/124.116 |
| 4,165,098 A | * | 8/1979 | Wagner | ........... 280/124.128 |
| 4,165,099 A | * | 8/1979 | Wagner et al. | ...... 280/124.116 X |
| 4,386,799 A | * | 6/1983 | Molnar | ........... 293/122 |
| 4,466,636 A | * | 8/1984 | Cornacchia et al. | .. 280/124.116 |
| 4,623,164 A | | 11/1986 | Cassel et al. | |
| 4,700,796 A | * | 10/1987 | Morlok et al. | ........ 280/124.116 |
| 4,750,757 A | | 6/1988 | Long | |
| 4,790,974 A | | 12/1988 | Perkins et al. | |
| 4,951,962 A | | 8/1990 | Tomida et al. | |
| 5,118,131 A | * | 6/1992 | Manning | .......... 280/124.116 X |
| 5,215,329 A | * | 6/1993 | Santo | ............... 280/124.116 X |
| 5,215,331 A | * | 6/1993 | Pittman | .................. 280/800 X |
| 5,772,192 A | * | 6/1998 | Hoffmann | ..................... 269/37 |
| 5,855,394 A | * | 1/1999 | Horton et al. | .......... 280/800 X |
| 5,938,869 A | * | 8/1999 | Kaido et al. | ................. 152/510 |
| 6,010,155 A | * | 1/2000 | Richart | .................... 280/800 X |
| 6,035,087 A | * | 3/2000 | Bonicel et al. | ............. 385/109 |
| 6,113,164 A | * | 9/2000 | Setina | ......................... 293/115 |
| 6,300,415 B1 | * | 10/2001 | Okayama et al. | ............ 264/165 |

FOREIGN PATENT DOCUMENTS

FR  2745240  8/1997

* cited by examiner

Primary Examiner—Paul N. Dickson
Assistant Examiner—Toan To
(74) Attorney, Agent, or Firm—Oblon, Spivak, McClelland, Maier & Neustadt, P.C.

(57) ABSTRACT

A deformable transverse member for a motor vehicle rear axle assembly with trailing arms is formed of a metal section piece having a continuous longitudinal opening that extends along at least 80% of the length of the metal section piece and is fitted with a block of elastomeric material fastened to the section piece at a position selected to close off a central part of the continuous longitudinal opening.

5 Claims, 9 Drawing Sheets

TRANSVERSE MEMBER FOR A MOTOR VEHICLE REAR AXLE ASSEMBLY

CROSS REFERENCE TO RELATED APPLICATION

This application claims priority from French Patent Application Serial No. 98-10557 filed on Aug. 19, 1998, which is incorporated herein by reference.

BACKGROUND OF THE INVENTION

1. Field of the Invention

The subject of the present invention is a deformable transverse member for a motor vehicle rear axle assembly, especially a rear axle assembly with trailing arms.

2. Description of Related Art

Of all the technical solutions regarding motor vehicle rear axle assemblies, the semirigid axle is a simple and economical solution because, in one component, it provides the wheels of the rear axle assembly with guidance and fulfils the anti-roll function.

In general, the semi-rigid axle is made up of two trailing arms connected by a transverse member.

The assembly thus formed is attached to the body of the vehicle via two elastic mounts.

The transverse member is connected rigidly to the arm usually by two gusset plates each fixed, on the one hand, to the end of the transverse member and, on the other hand, to the corresponding trailing arm, generally by welding.

The distance from the ends of the arm at which the transverse member is positioned varies according to the configuration of the vehicle rear axle assembly. This position depends on the overall architecture of the vehicle substructure and, in particular, depends on the location of the fuel tank. To fulfill its dual role of providing guidance and acting as an antiroll bar, this transverse member must have a given rigidity particularly in torsion and in bending so as to obtain an ideal compromise between the road holding ability of the vehicle and the comfort of the passengers, particularly in the case of a touring vehicle.

Specifically, the use of an excessively rigid transverse member prevents practically all vehicle body roll, but causes jolts which are uncomfortable for the passengers, and sometimes is associated with a wheel lifting off the ground, which is detrimental to the road holding of this vehicle.

The use of an excessively flexible transverse member prevents any lifting of the wheels during normal driving of the vehicle, but generates a phenomenon of significant roll which is also dangerous for the passengers.

Most deformable transverse members for trailing arm rear axle assemblies have a cross section which, along their entire length, exhibit a profile of the so-called open section type, for example in the overall shape of a C, a U or a V.

This type of transverse member has the particular feature of offering torsional rigidity that is compatible with the sought-after values limiting vehicle body roll while at the same time providing good road holding ability.

In an effort to reduce the weight of the vehicle, manufacturers have been decreasing the wall thickness of the transverse member within the possible limits dictated by the mechanical strength of this transverse member, but this reduction in wall thickness on an open-section transverse member does, nonetheless, lead to a significant reduction in the torsional stiffness of this transverse member, thus increasing the possibilty of vehicle body roll.

So, to maintain the same vehicle characteristics, particularly as regards roll, manufacturers wishing to restrict the weight of the vehicles have been forced to complement the open-section transverse member with a device for limiting roll, for example an antiroll bar.

Another solution could consist in using a transverse member with a closed cross section along its entire length, but with reduced wall thickness.

However, to exhibit a torsional stiffness that is compatible with the sought-after values in order to obtain a compromise between the road holding ability of the vehicle and desired the level of passenger comfort, it would be necessary either to reduce greatly the cross section of the transverse member or to keep the same cross section while reducing the wall thickness or to reduce both the cross section and the wall thickness of the transverse member.

Such a reduction in thickness is incompatible with the mechanical strength of the transverse member, even if a steel with a high elastic limit is used.

Likewise, reducing the cross section of the transverse member would generate very high stresses at the connection between this transverse member and the arm of the axle.

For this reason, French Patent No. 2,745,240 discloses a transverse member for a rear axle assembly which comprises a central region in which the cross section of this transverse member is a closed profile and two lateral zones in which the cross section of this transverse member is an open profile.

However, this type of transverse member has drawbacks, the main drawback lying in the fact that the stresses generated at the interfaces between the open zones and the closed central zone are high as will be seen later. These stresses may cause, in these zones, cracks and therefore zones of weakness which are incompatible with the mechanical strength of the transverse member.

SUMMARY OF THE INVENTION

The object of the invention is to avoid these drawbacks by proposing a transverse member whose torsional stiffness can be altered according to the characteristics sought for the rear axle assembly and which makes it possible to reduce the cross section and/or the wall thickness, and therefore the weight of the motor vehicle.

The subject of the invention is therefore a deformable transverse member for a motor vehicle, especially a rear axle assembly with trailing arms, characterized in that it is formed of a metal section piece comprising a continuous longitudinal opening extending along at least 80% of the length of the further section piece and in that it is fitted with a block of elastomeric material fastened to the section piece and closing off the central part of the longitudinal opening.

According to other features of the invention:
- the section piece has several faces and the face comprising the longitudinal opening has two opposed turned-down edges against which the block of elastomeric material rests,
- the block is formed of a sheet which has a cross section in the shape of a quadrilateral,
- the block is formed of a sheet which has a U-shaped cross section,
- the block has vertical side edges or parallel and inclined side edges,
- the block is fastened to the section piece by bonding or by screw fasteners, and
- the elastomeric material of the block has a Young's modulus of between 200 and 500 MPa.

The invention will be better understood from reading the description which will follow, given merely by way of example, for an understanding of which reference will be made to the appended drawings, in:

DETAILED DESCRIPTION OF THE INVENTION

Figure 1:
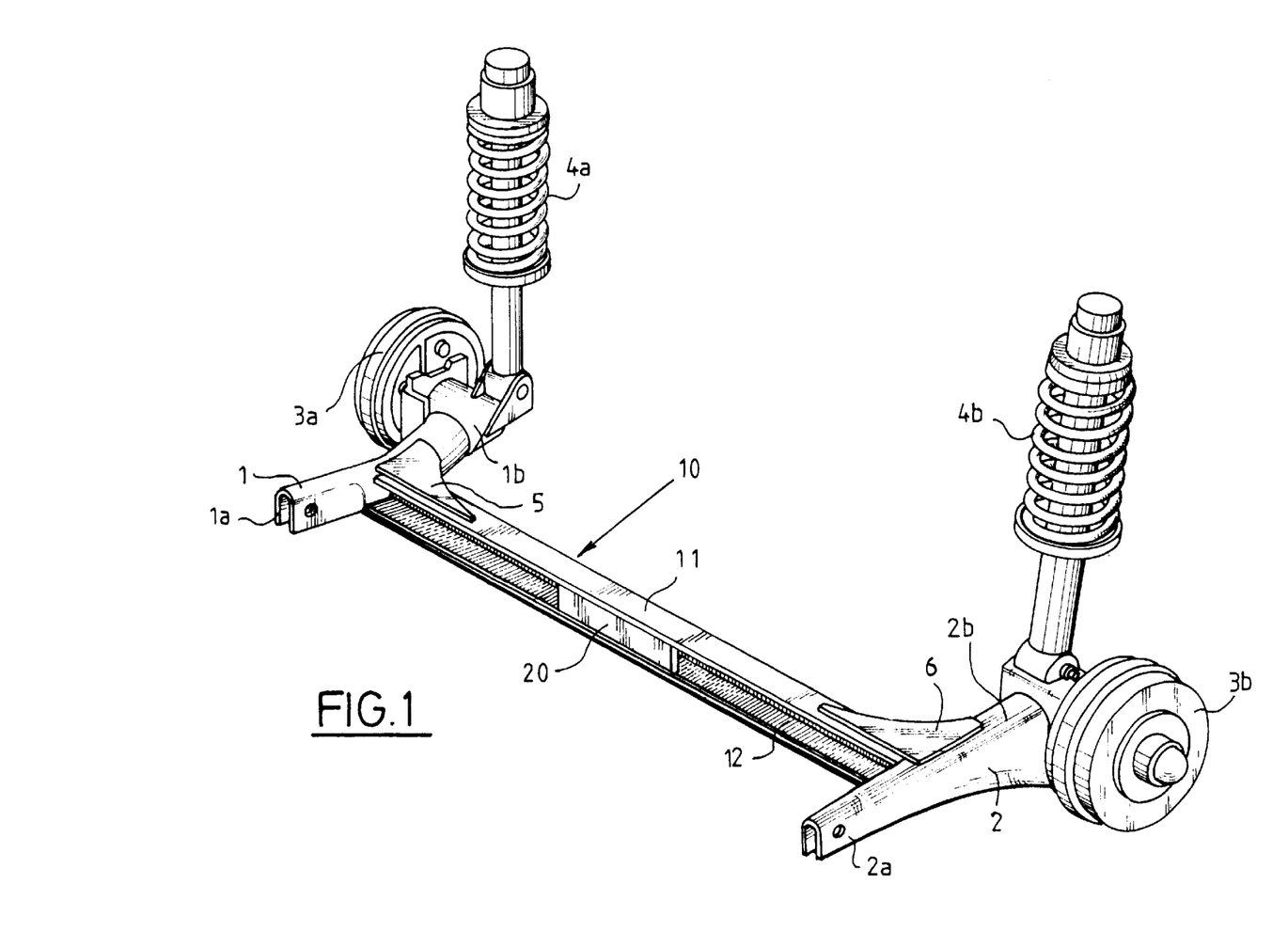
FIG. 1 is a diagrammatic view in perspective of a trailing arm or a rear axle assembly of a motor vehicle, equipped with a transverse member in accordance with the invention.

FIG. 1 depicts a semi-rigid rear axle assembly with two parallel trailing arms 1 and 2 respectively.

The arms 1 and 2 are connected at one of their ends. 1a and 2a respectively, the body of the vehicle by an elastic connection of a known type not depicted.

On the other hand, the arms 1 and 2 support, at their opposite ends 1b and 2b, to the ends which are connected to the body of the vehicle, i.e. members 3a and 3b for supporting the corresponding wheel.

Each end 1b and 2b of the arms 1 and 2 is also connected to the vehicle body via a shock absorber 4a and 4b respectively.

Furthermore, the arms 1 and 2 are connected together rigidly by a transverse member 10.

In this embodiment, this transverse member 10 is connected to each arm 1 and 2 via a gusset plate 5 and 6 respectively welded, on the one hand, to the corresponding end of the transverse member 10 and, on the other hand, to the corresponding arm 1 or 2.

The transverse member 10, the two arms 1 and 2 and the gusset plates 5 and 6 form the axle of the rear axle assembly depicted in FIG. 1.

The distance from the ends 1a and 2a of the arms 1 and 2 at which the transverse member 10 is positioned varies according to the configuration of the vehicle rear axle assembly. This position depends on the overall architecture of the substructure and in particular depends on the location of the fuel tank.

Figure 2:
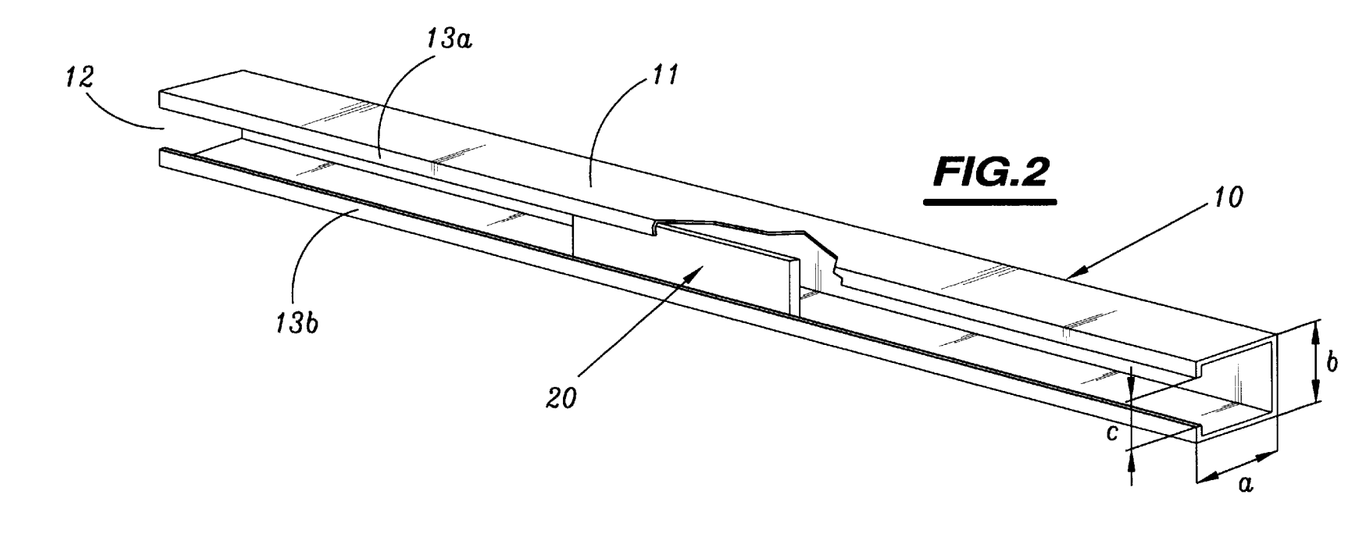
FIG. 2 is the perspective view with a partial cutaway of the transverse member in accordance with the invention.

As depicted more specifically in FIG. 2, the transverse member 10 is formed of a metal section piece 11 comprising a continuous longitudinal opening 12 extending over at least 80% of the span of the section piece 11.

In the embodiment depicted in FIGS. 1 and 2, the longitudinal opening 12 extends over the entire length of the section piece 11.

According to an alternative form which has not been depicted, the ends of the transverse member 10 may have a cross section with a closed profile, it being possible for this cross section to differ from the cross section of the section piece 11. Specifically, these ends could be closed by flattening a portion of this section piece 11.

As a preference, and as depicted, the section piece 11 has several faces, one of which has the longitudinal opening 12 which comprises two opposed turned-down edges.

For example, the section piece 11 is in the shape of a U and the end of each free branch has a turned-down edge 13a and 13b respectively.

The section piece 11 may also have other shapes.

The central part of the opening 12 is closed by a block 20 of elastomeric material fastened to the section piece 11. and resting on the internal face of each turned-down edge 13a and 13b.

The block 20 of elastomeric material is fastened to the horizontal parts of the section piece 11 by screws, not depicted, which pass through this block 20 in its height, or by bonding onto the internal face of the horizontal parts or on the turned-down edges 13a and 13b.

Figure 3:
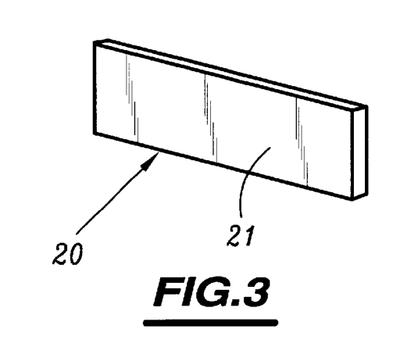
FIGS. 3 to 5 are views in perspective showing several embodiments of a block of elastomeric material fitted to the transverse member in accordance with the invention.

According to a first embodiment depicted in FIG. 3, the block 20 is formed of a sheet 21 which has a cross section in the shape of a quadrilateral, the side edges of which are vertical.

Figure 4:
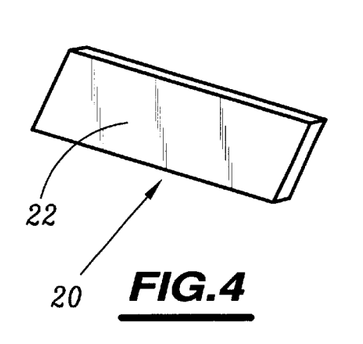

According to a second embodiment depicted in FIG. 4, the block 20 is formed of a sheet 22 which has a cross section in the shape of a quadrilateral and the side edges of which are parallel and inclined.

Figure 5:
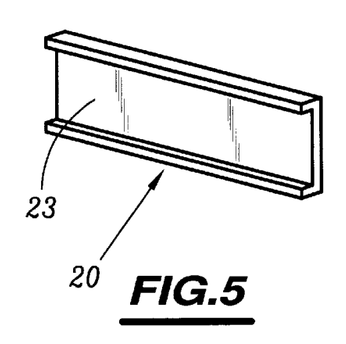

According to a third embodiment depicted in FIG. 5, the block 20 is formed of a sheet 23 which has a Ushaped cross section.

The side edges of the sheet 23 may be vertical or inclined.

The way in which the transverse member 10 is manufactured is discussed as follows.

First of all, the section piece 11 is formed with the desired cross section, such as, for example, in the form of a square, rectangular, round or trapezoidal section piece, and the block 20 is fastened to the internal face of each turned-down edge 13a and 13b. Next, the transverse member 10 is welded to the rest of the axle in exactly the same way as traditional transverse members.

As a preference, the elastomeric material of the block 20 has a Young's modulus of between 200 and 500 MPa.

Using the transverse member 10 according to the invention in a trailing-arm rear axle assembly, it is possible to reduce the wall thickness of the transverse member 10 and to obtain a mass saving of the order of 40% on this transverse member and more because it makes it possible to dispense with the anti-roll bar system.

The torsional inertia of the transverse member 10 can be adjusted very precisely by altering the width and/or thickness of the block 20 of elastomeric material as demonstrated hereinafter.

The assignee has carried out comparative tests to demonstrate the influence of the thickness, width, and shape of the block and of the means for fastening this block 20 on the mechanical characteristics of the transverse members 10, such as, for example, the rigidity of the axle and the stresses in the transverse member 10.

For these tests, the assignee used a Ushaped transverse member 10 as depicted in FIG. 2, the walls of which were 3 mm thick and had the following dimensions, a: 60 mm b: 60 mm c: 30 mm.

The mechanical properties of the steel of the transverse member 10 and of the elastomer of the block were as follows:

|  | Steel Transverse member | Elastomer rubber block |
| --- | --- | --- |
| Young's modulus | 210,000 MPa | 350 MPa |
| Poisson's ratio | 0.3 | 0.45 |
| Density | 7800 kg/m² | 600 kg/m² |

During these tests, the assignee performed two types of modeling: shell modeling; and shell and volume modeling.

For shell modeling the two arms 1 and 2, the two gusset plates 5 and 6 and the transverse member 10 were modeled as a shell. The block 20 of elastomeric material was modeled as shell element and was connected to the section piece 11 by screws.

For the shell and volume modeling, the two arms 1 and 2, the two gusset plates 5 and 6 and the transverse member 10 were modelled as a shell and the block 20 of elastomeric material was modeled as volumetric element.

In what follows, the assignee sets out the results of these tests in the form of tables which, in particular, show the side-slip of the wheel and the "Von-Mises" stresses.

The side-slip of the wheel is a simulation of the side-slip of the, vehicle with an acceleration of 0.97 g in a bend. The side-slip is simulated by applying forces in the region of the wheel-road contact, the elastic couplings and the shock absorbers.

The stresses were calculated in two ways: first, by using a widened mesh in which each elemental area gave a stress value which is called the wide stress; and second, by using a finer mesh and more precise elemental area, which is called the point stress.

A—Shell Modeling

A1—Rectangular Block with Vertical Edges (FIG. 3)

1a—Influence of the Thickness of the Block of Elastomeric Material

In this test, the assignee used a block of elastomeric material 197.6 mm wide and fastened to the transverse member 10 by two sets of seven screws 8 mm in diameter.

The results are presented in the table below:

| | | Stress on transverse member | | Stress at | | |
| --- | --- | --- | --- | --- | --- | --- |
| Block thickness mm | Wheel side-slip Mm | Maximum point stress MPa | Maximum wide stress MPa | metal/ elastomer interface MPa | Loading in screws MPa | Moment in screws MPa |
| 15 | 120.1 | 608 | 406 | 10.6 | 1828 | 25,297 |
| 20 | 116.3 | 595 | 394 | 9.8 | 2248 | 26,932 |
| 25 | 113.1 | 584 | 384 | 9.3 | 2615 | 27,765 |
| 30 | 110.2 | 574 | 374 | 8.8 | 2939 | 28,384 |
| 35 | 107.5 | 585 | 365 | 9.3 | 2615 | 27,765 |
| 40 | 104.9 | 593 | 357 | 8.8 | 3478 | 28,843 |
| 45 | 102.3 | 599 | 351 | 8.0 | 3698 | 28,743 |

Figure 6:
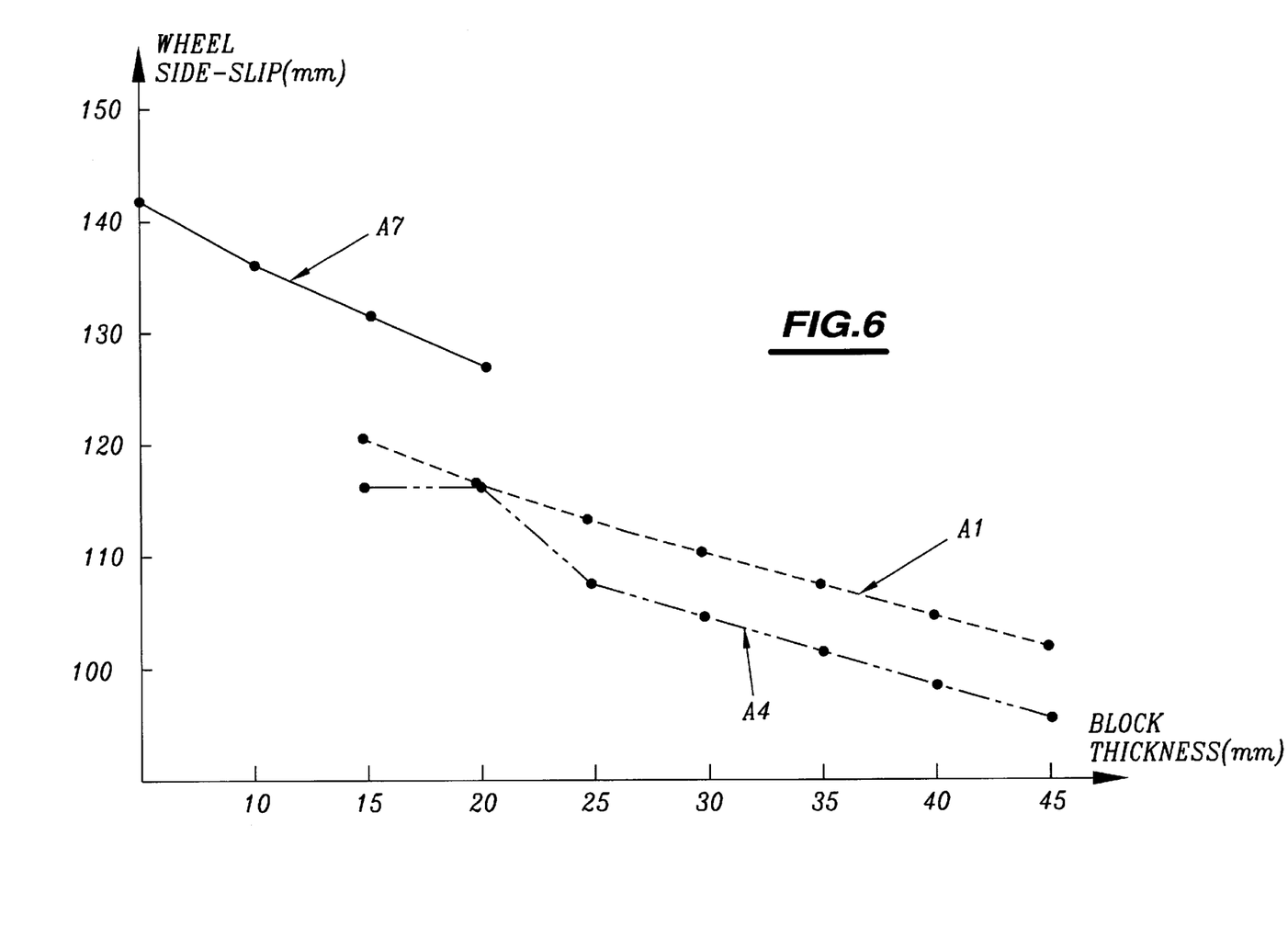
FIGS. 6 to 11 are graphs showing the results of tests performed with different embodiments of transverse members in accordance with the invention and, FIG. 12 is a perspective view of the transverse member according to the state of the art.
Figure 7:
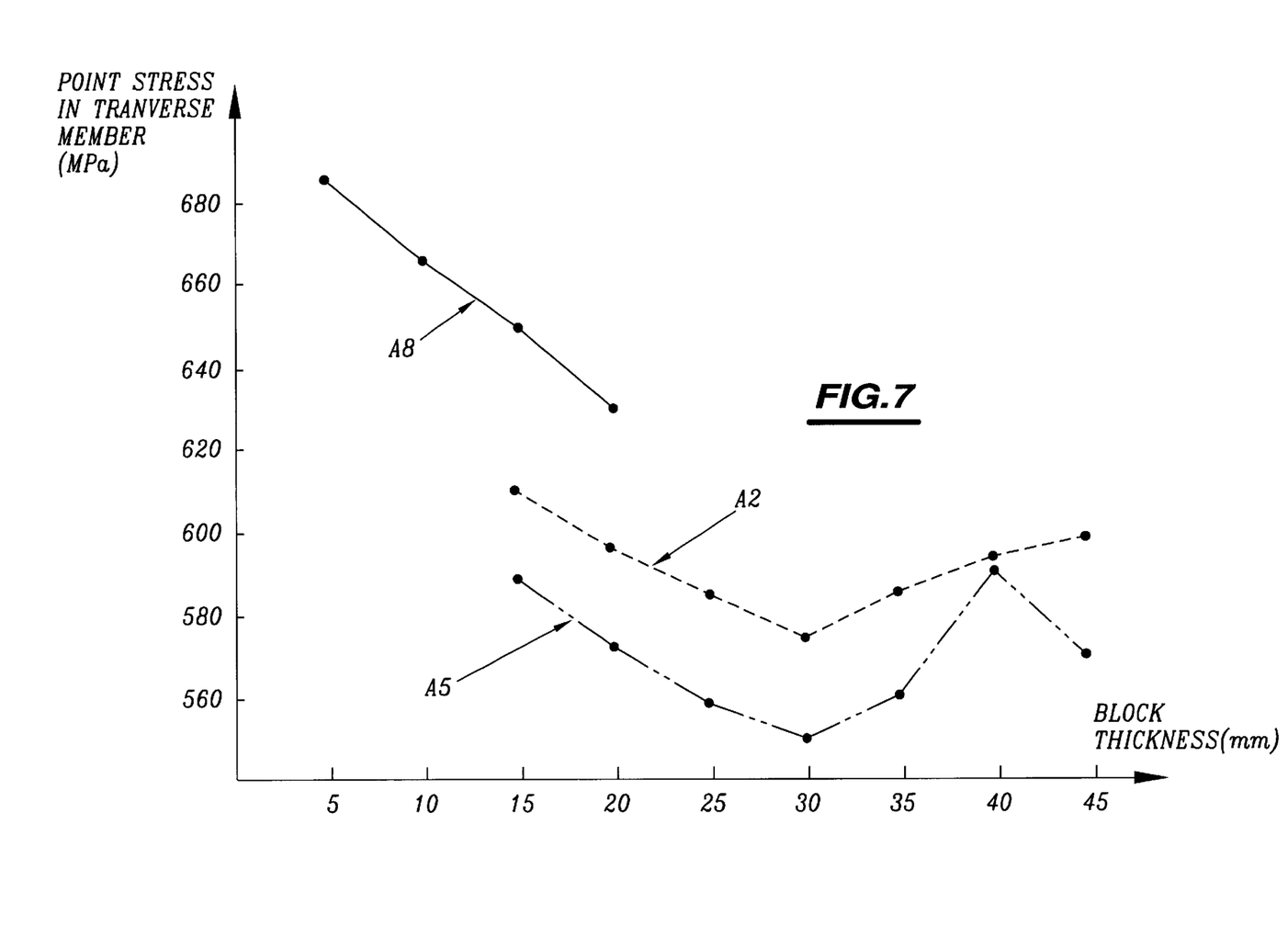
Figure 8:
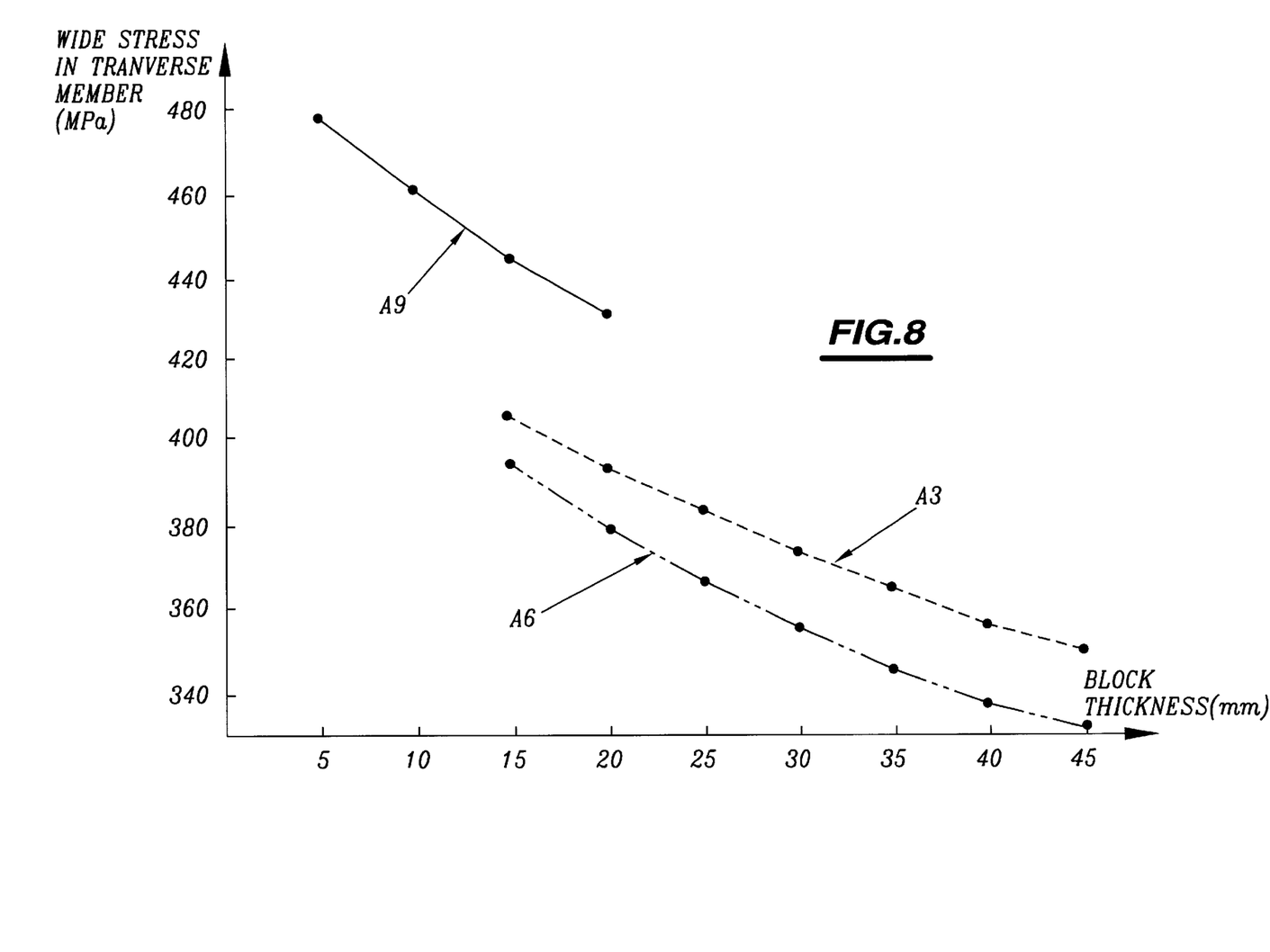

These results have been plotted on curves A1, A2 and A3 in FIGS. 6 to 8, respectively which depict:
in the case of FIG. 6: the side-slip of the wheel as a function of the thickness of the block,
in the case of FIG. 7: the point stresses in the transverse member as a function of the thickness of the block, and
in the case of FIG. 8: the wide stresses in the transverse member as a function of the thickness of the block.

As shown by curves A1 and A3, in FIGS. 6 and 8 respectively, the rigidity of the axle and the value of the wide stress varies as a linear function of the thickness of the block of elastomeric material.

By contrast, the value of the point stress passes through a minimum for a block thickness of 30 mm before increasing again, as depicted in curve A2 of FIG. 7.

The maximum stresses generated in the transverse member are located in the vicinity of the screws that fasten the block of elastomeric material.

1b—Influence of the Number of Screws for Fastening the Block of Elastomeric Material These tests were performed with an elastomer block 30 mm thick and 197.6 mm long. There were 14 screws in a first test and 6 in a second tests:

The results obtained are shown in the table below.

| | | Stress on transverse member | | Stress at | | |
| --- | --- | --- | --- | --- | --- | --- |
| Number of screws | Wheel side-slip mm | Maximum point stress Mpa | Maximum wide stress MPa | metal/ elastomer interface MPa | Loading in screws MPa | Moment in screws MPa |
| 2 × 7 | 110.2 | 574 | 374 | 8.8 | 2939 | 28,384 |
| 2 × 3 | 125.3 | 668 | 424 | 10.2 | 4250 | 37,170 |

These results demonstrate that the greater the number of screws for fastening the block of elastomeric material to the section piece of the transverse member, the more rigid the transverse member will be and the lower the stresses will be.

1c—Influence of the Width of the Block of Elastomeric Material

This test was performed with a block of elastomeric material 30 mm thick. The number of screws varied according to the size of the block—14 screws were used for a block 197.6 mm long, 10 screws were used for a block 141.2 mm long and 6 screws were used for a block 84.71 mm long.

The results are shown in the table below:

| | | Stress on transverse member | | Stress at | | |
| --- | --- | --- | --- | --- | --- | --- |
| Width mm | Wheel side-slip mm | Maximum point stress MPa | Maximum wide stress MPa | metal/ elastomer interface MPa | Loading in screws MPa | Moment in screws MPa |
| 197.6 | 110.2 | 574 | 374 | 8.8 | 2939 | 28,384 |
| 141.2 | 118.9 | 604 | 402 | 10.4 | 3045 | 29,041 |
| 84.7 | 130.2 | 644 | 439 | 10.6 | 2582 | 27,355 |

This test demonstrated that the narrower the block of elastomeric material, the greater the increase in stress in the section piece of the transverse member and the more rigid this transverse member will be.

A2—Block with Inclined Edges (FIG. 4)

2a—Influence of the Thickness of the Block of Elastomeric Material

This test was performed by varying the thickness of the block of elastomeric material for a constant width of 197.6 mm and with 14 fastening screws each 8 mm in diameter.

The results of this test are shown in the table below:

| Block thickness mm | Wheel side-slip mm | Stress on transverse member | | Stress at metal/ elastomer interface MPa | Loading in screws MPa | Moment in screws MPa |
| --- | --- | --- | --- | --- | --- | --- |
| | | Maximum point stress MPa | Maximum wide stress MPa | | | |
| 15 | 116 | 588 | 395 | 10.1 | 1918 | 25,523 |
| 20 | 116.1 | 572 | 380 | 9.0 | 2197 | 24,317 |
| 25 | 107.7 | 558 | 367 | 8.4 | 2420 | 24,458 |
| 30 | 104.5 | 550 | 356 | 6.6 | 2606 | 24,248 |
| 35 | 101.2 | 561 | 346 | 7.5 | 2758 | 24,972 |
| 40 | 98.3 | 591 | 336 | 7.2 | 2885 | 23,294 |
| 45 | 95.5 | 571 | 332 | 6.9 | 2988 | 22,673 |

The results of this test have been plotted in FIGS. 6 to 8 and give the curves A4, A5 and A6 respectively.

As shown by the curves A4 and A6, in FIGS. 6 and 8 respectively, the rigidity of the transverse member and the value of the wide stress vary as a linear function of the thickness of the block of elastomeric material. By contrast, the value of the point stress passes through a minimum for a block thickness of 30 mm before increasing, as depicted by curve A5 in FIG. 7.

The maximum stresses generated in the transverse member are located in the vicinity of the screws for fastening the block of elastomeric material.

2b—Influence of the Number of Screws for Fastening the Block of Elastomeric Material This test was performed with a block of elastomeric material 30 mm thick and 197.6 mm long. In this test, the block was fastened to the section piece of the transverse member by 14 screws, 6 screws and 4 screws in turn.

The results of this test are shown in the table below:

| Number of screws | Wheel side-slip mm | Stress on transverse member | | Stress at metal/ elastomer interface MPa | Loading in screws MPa | Moment in screws MPa |
| --- | --- | --- | --- | --- | --- | --- |
| | | Maximum point stress MPa | Maximum wide stress Mpa | | | |
| 2 × 7 | 104.5 | 550 | 356 | 6.6 | 2606 | 24,248 |
| 2 × 3 | 115.6 | 616 | 394 | 8.7 | 5117 | 30,398 |
| 2 × 2 | 126.0 | 658 | 429 | 10 | 4077 | 31,868 |

This test showed that the higher the number of fastening screws, the more rigid the transverse member and the lower the stresses.

2c: Influence of the Width of the Block of Elastomeric Material

This test was performed with a block of elastomeric material 30 mm thick. The number of fastening screws varied according to the size of the block—14 screws were used for a block 197.6 mm wide, 10 screws were used for a block 141.2 mm wide and 6 screws were used for a block 84.71 mm wide.

The results of this test are shown in the table below:

| Width mm | Wheel side-slip mm | Stress on transverse member | | Stress at metal/ elastomer interface Mpa | Loading in screws MPa | Moment in screws MPa |
| --- | --- | --- | --- | --- | --- | --- |
| | | Maximum point stress MPa | Maximum wide stress MPa | | | |
| 197.6 | 104.5 | 550 | 356 | 6.6 | 2606 | 24,248 |
| 141.2 | 113.9 | 583 | 388 | 8.8 | 2889 | 27,033 |
| 84.7 | 126.6 | 640 | 429 | 9.7 | 2798 | 29,884 |

This test demonstrated that the more the width of the block of elastomeric material was reduced, the more the stresses generated in the transverse member increased and the more rigid this transverse member was.

In general, the above mentioned tests demonstrated that, on the whole, the stresses and displacements, i.e. the side-slip of the wheel, were lower for a block with parallel and inclined side edges than for a block with straight side edges. Whether the side edges are inclined to the left or to the right had no influence on the results.

A3—U-shaped Block (FIG. 5)

3a—Influence of the Thickness of the Block of Elastomeric Material

This test was performed by varying the thickness of the block of elastomeric material for a constant width of 197.6 mm. The number of screws was 14, each of a diameter of 8 mm.

The results of this test are shown in the table below:

| Block thickness mm | Wheel side-slip mm | Stress on transverse member | | Stress at metal/ elastomer interface Mpa | Loading in screws MPa | Moment in screws MPa |
| --- | --- | --- | --- | --- | --- | --- |
| | | Maximum point stress MPa | Maximum wide stress MPa | | | |
| 5 | 141.8 | 685 | 478 | 10.1 | 241 | 1213 |
| 10 | 136.6 | 666 | 461 | 9.2 | 609 | 2847 |
| 15 | 131.9 | 650 | 445 | 8.3 | 911 | 4108 |
| 20 | 127.1 | 631 | 431 | 7.7 | 1172 | 7755 |

The results of this test have been plotted in FIGS. 6 to 8 respectively in which the curve A7 represents the variation in wheel side-slip as a function of block thickness, the curve A8 represents the point stress in the transverse member as a function of block thickness and the curve A9 represents the wide stress in the transverse member as a function of block thickness.

These curves A7, A8 and A9 demonstrate that an increase in block thickness increases the wheel side-slip. Unlike the blocks previously tested, the value of the stress does not vary linearly.

3b—Influence of the Number of Screws for Fastening the Block of Elastomeric Material This test was performed with a block of elastomeric material 10 mm thick and 197.6 mm long, fastened to the section piece of the transverse member using 14 and 6 screws respectively.

The results are shown in the table below:

|  | Stress on transverse member | | Stress at | | |
|---|---|---|---|---|---|
| Number of screws | Wheel side-slip mm | Maximum point stress MPa | Maximum wide stress MPa | metal/ elastomer interface MPa | Loading in screws MPa | Moment in screws MPa |
| 2 × 7 | 136.6 | 666 | 461 | 9.2 | 609 | 2847 |
| 2 × 3 | 138.4 | 672 | 466 | 11 | 1191 | 5762 |

This test shows that the higher the number of fastening screws, the more rigid the transverse member will be.

This test also demonstrates that the use of a Ushaped block makes it possible to reduce the loading and moment on the screws compared with the blocks used in the previous tests.

3c—Influence of the Width of the Block of Elastomeric Material

This test was performed with a block of elastomeric material 10 mm thick. The number of fastening screws varied according to the size of the block—14 screws were used for a block 197.6 mm wide, 10 screws were used for a block 141.2 mm wide and 6 screws were used for a block 84.7 mm wide.

The results of this test are shown in the table below:

| Block width mm | Wheel side-slip mm | Stress on transverse member | | | Stress at | |
|---|---|---|---|---|---|---|
|  |  | Maximum point stress MPa | Maximum wide stress MPa | metal/ elastomer interface MPa | Loading in screws MPa | Moment in screws MPa |
| 197.6 | 136.6 | 666 | 461 | 9.2 | 609 | 2847 |
| 141.2 | 139.7 | 677 | 471 | 9.2 | 508 | 3293 |
| 84.7 | 142.9 | 688 | 482 | 7.7 | 419 | 2787 |

This test demonstrates that, with a block of U-shaped cross section, the point stress and the wide stress increase as the block width decreases while the loading and moment on the screws decrease with a reduction in the width of the block of elastomeric material.

B—Shell and Volume Modeling

In the tests discussed below, the geometry, conditions and limits and the mechanical properties of the materials were identical to those of the shell-only version.

In these tests, the block of elastomeric material was bonded directly to the section piece of the transverse member and the three block geometries were retested.

B1: Influence of the Thickness of a Rectangular Block with Vertical Side Edges (FIG. 3)

This test was performed with a block 197.6 mm wide and of varying thickness.

The results of this test are listed in the table below.

| Block thickness mm | Wheel side-slip Mm | Stress in transverse member | | Stress at metal/ elastomer interface Mpa |
|---|---|---|---|---|
|  |  | Maximum point stress MPa | Maximum wide stress MPa |  |
| 7.5 | 130.9 | 645 | 466 | 10.6 |
| 15 | 123.2 | 617 | 446 | 9.8 |
| 22.5 | 118.9 | 602 | 435 | 9.3 |
| 30 | 116.5 | 594 | 428 | 8.0 |
| 37.5 | 115.4 | 590 | 425 | 7.8 |

Figure 9:
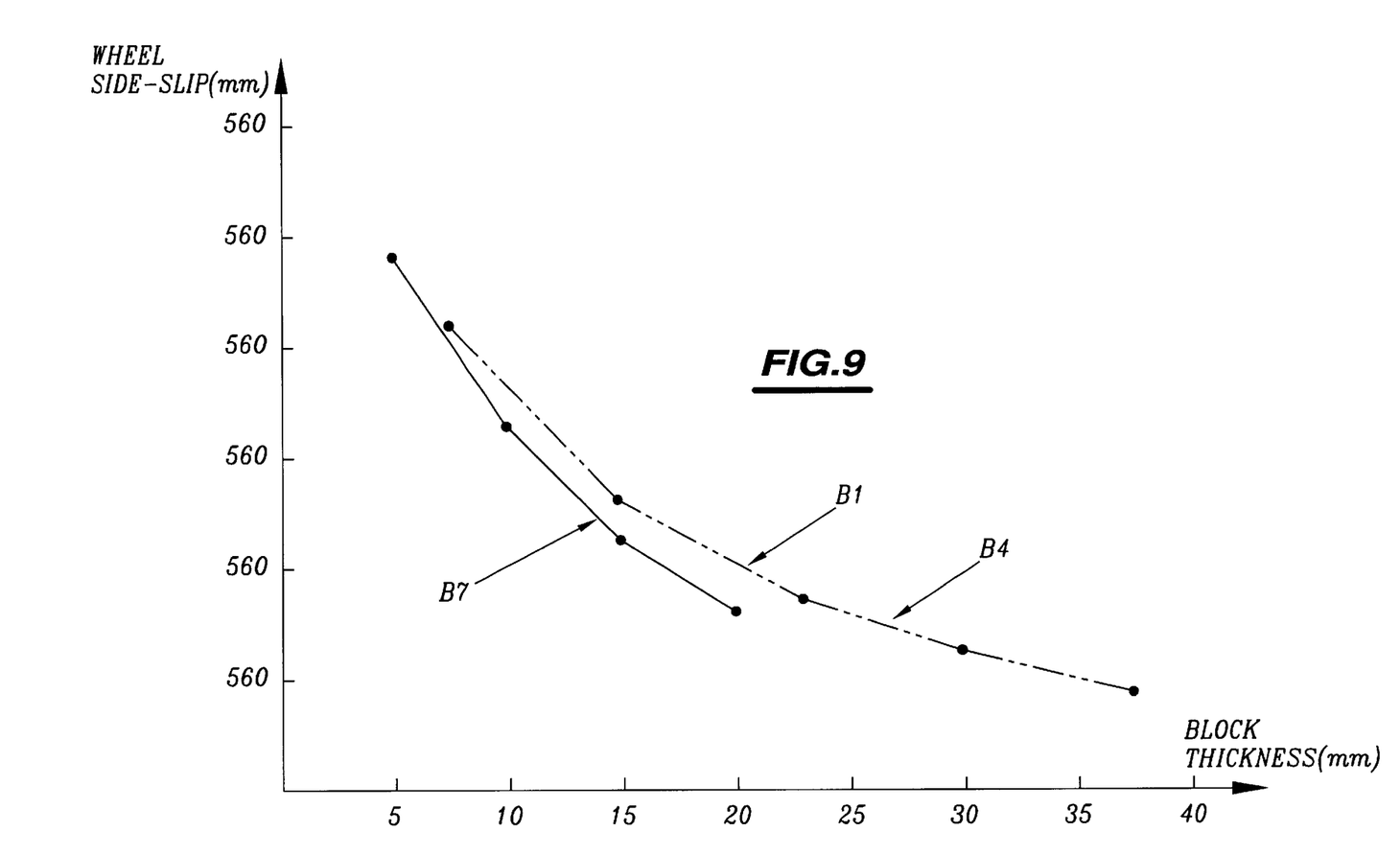
Figure 10:
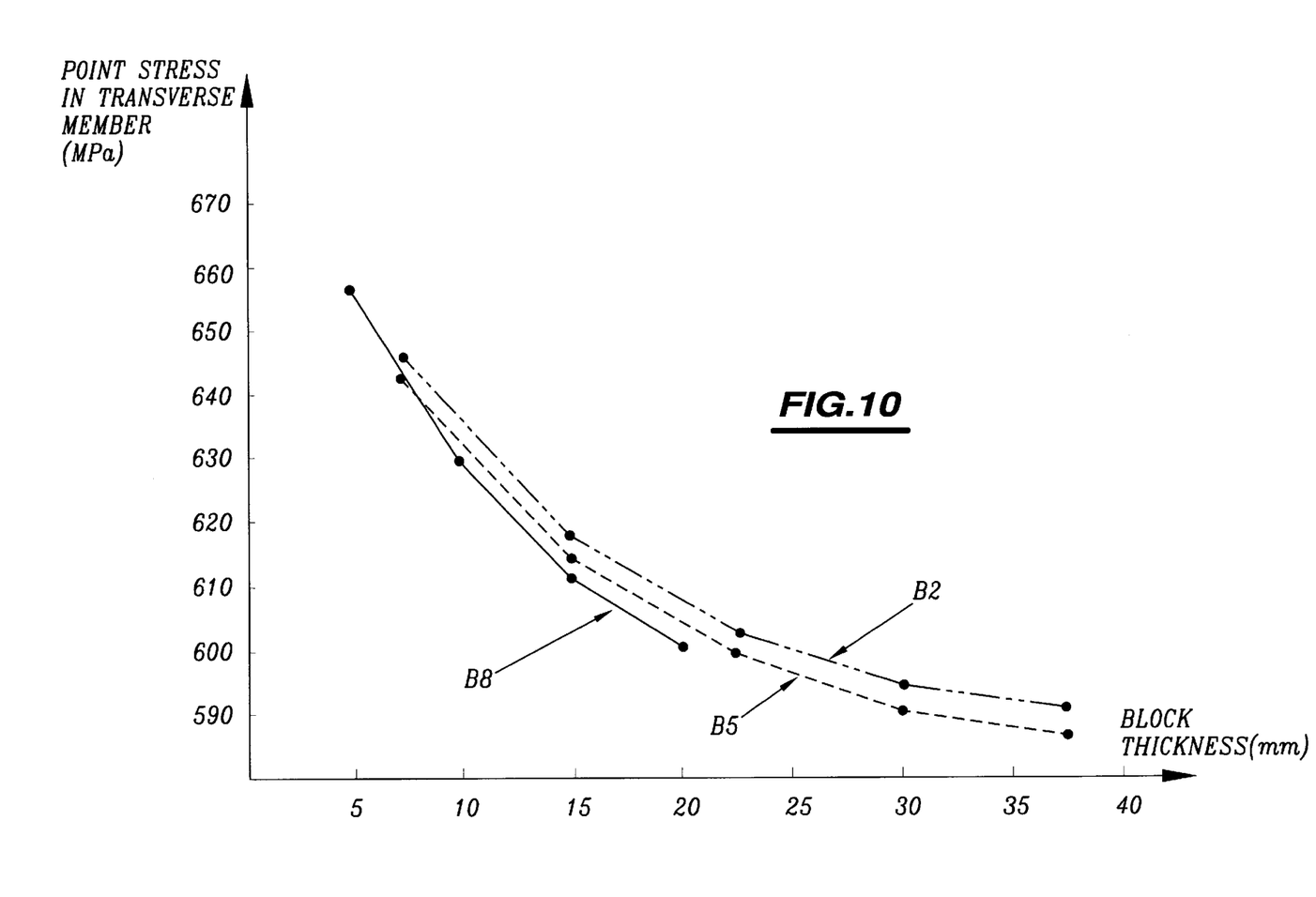
Figure 11:
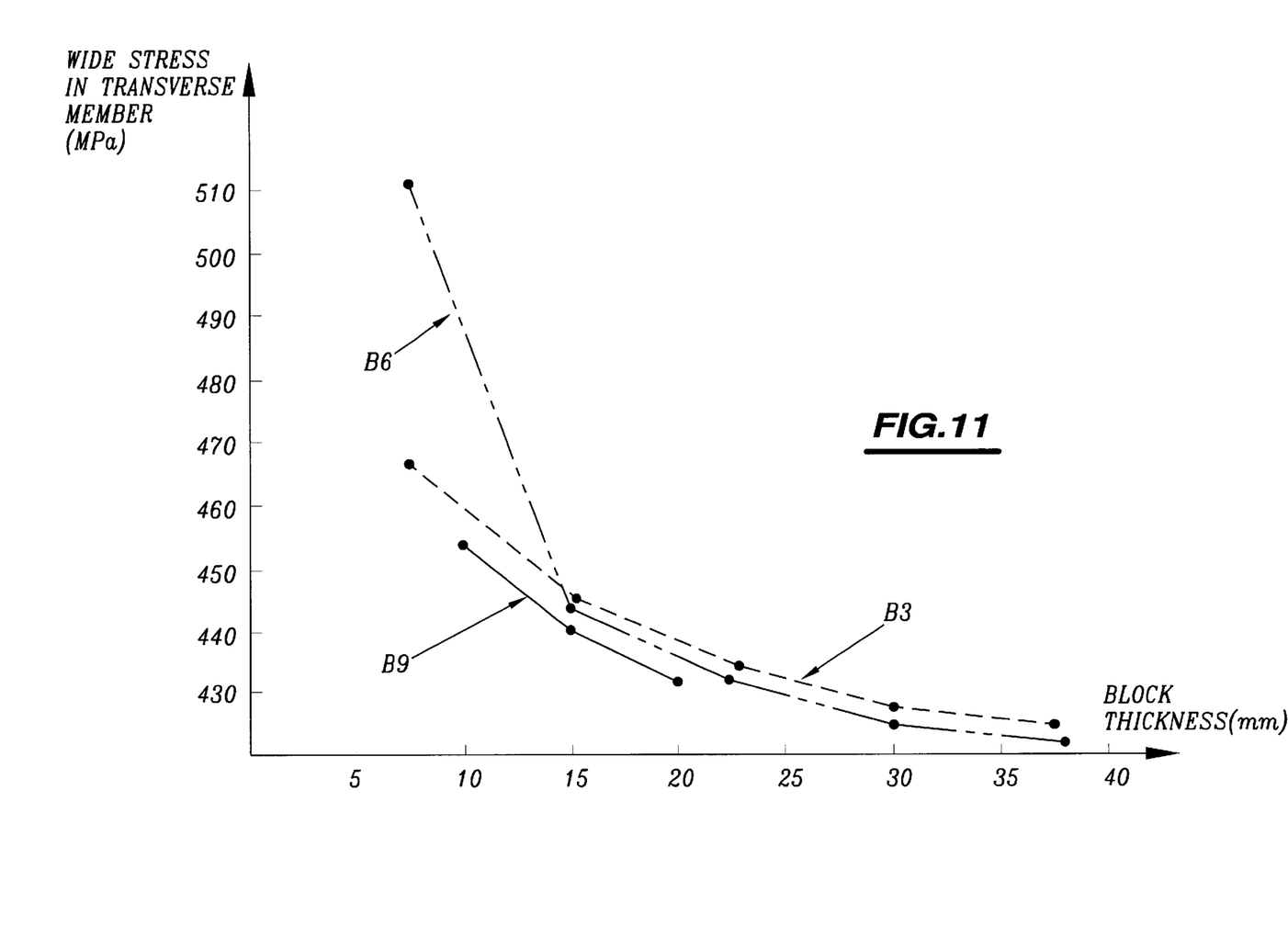

The results of these tests have been depicted in FIGS. 9, 10 and 11 which depict:

in the case of FIG. 9: the side-slip of the wheel as a function of block thickness—curve B1, in the case of FIG. 10: the point stress in the transverse member as a function of block thickness—curve B2, and in the case of FIG. 11: the wide stress in the transverse member as a function of block thickness—curve B3.

The curves B1, B2 and B3 demonstrate, on the one hand, that the side-slip of the wheel decreases as the block thickness increases and, on the other hand, that the stresses in the transverse member and at the metal/elastomer interface also decrease as the thickness of the block of elastomeric material increases.

B2—Influence of the Thickness of the Block with Inclined Edges (FIG. 4)

This test was performed by varying the thickness of the block of elastomeric material for a constant width of 197.6 mm.

The results of this test are shown in the table below:

| Block thickness mm | Wheel side-slip mm | Stress in transverse member | | Stress at metal/ elastomer interface MPa |
|---|---|---|---|---|
|  |  | Maximum point stress MPa | Maximum wide stress MPa |  |
| 7.5 | 130.9 | 642 | 511 | 10.6 |
| 15 | 123.2 | 614 | 444 | 9.8 |
| 22.5 | 118.9 | 599 | 432 | 9.5 |
| 30 | 116.5 | 590 | 425 | 8.8 |
| 37.5 | 115.4 | 586 | 422 | 8.6 |

Curves B4, B5 and B6 respectively show the change in the side-slip of the wheel and in the stress in the transverse member as a function of thickness, curve B4 being coincident with curve B1. The difference in behavior between a block with vertical side edges and a block with inclined and parallel side edges is very small, as these curves show if a comparison with curves B1, B2 and B3 is made.

B3—U-shaped block (FIG. 5)

This test was performed with a block 197.6 mm wide, varying the thickness of this block.

The results of this test are listed in the table below:

| Block thickness mm | Wheel side-slip mm | Stress in transverse member | | Stress at metal/elastomer interface MPa |
|---|---|---|---|---|
| | | Maximum point stress MPa | Maximum wide stress MPa | |
| 5 | 134.0 | 656 | 523 | 10.6 |
| 10 | 126.4 | 629 | 454 | 9.8 |
| 15 | 121.4 | 611 | 441 | 9.4 |
| 20 | 118.2 | 600 | 432 | 9.1 |

The results of this test are depicted in curves B7, B8 and B9 of FIGS. 9, 10 and 11 respectively and demonstrate that the difference in behavior of the transverse member between a block of quadrilateral-shaped cross section and a block of U-shaped cross section is very slight.

These tests demonstrate that the use of a block of elastomeric material to close the central part of the section piece of the transverse member makes it possible to considerably lower the stresses in the zone at the interface between the closed parts and the open parts of the section piece of which the transverse member consists.

The use of a block of elastomeric material makes it possible to obtain a stiffening of the transverse member. This stiffening increases with the rate of application of stress and a damping effect for the return to the neutral point. This effect increases the passive safety of the vehicle.

The torsional inertia of the transverse member according to the invention can be adjusted very precisely by varying the dimensions and/or the shape of the block of elastomeric material closing the central part of the section piece of the transverse member.

These tests also demonstrated that bonding the block of elastomeric material to the transverse member gave better results in terms of rigidity and stress than the screw-fastened solution.

Furthermore, of the three shapes of block, the Ushape gave the best results. Moreover, this shape is well suited to bonding the block of elastomeric material to the transverse member.

The transverse member according to the invention also has the advantage of being modular because its width can be adapted to suit the track of the vehicle.

To demonstrate the advantages of the transverse member according to the invention compared with a transverse member according to, the state of the art described in French Patent No. 2,745,240, the assignee performed tests on a transverse member according to this state of the art.

Figure 12:
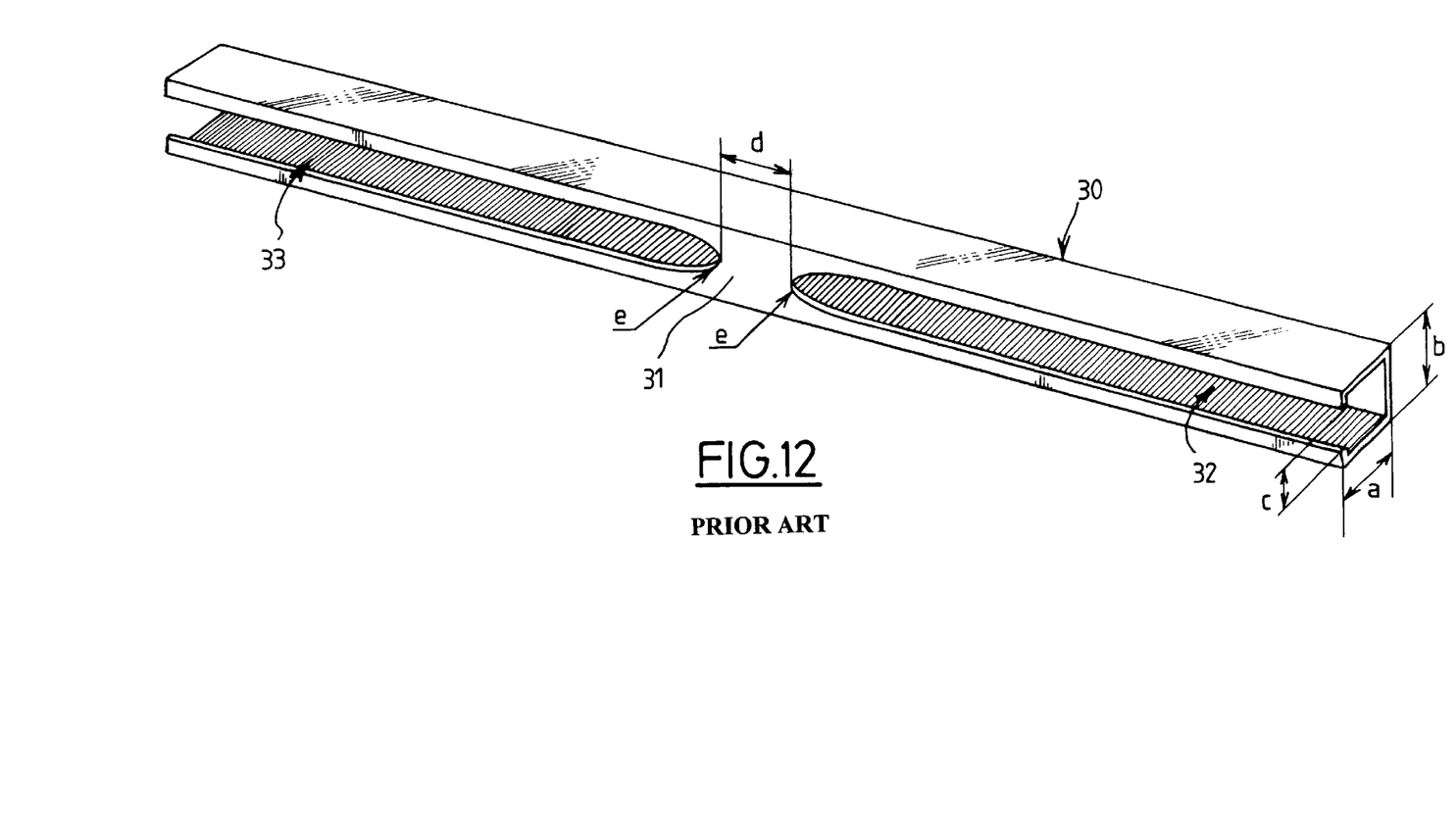

For this purpose, a transverse member 30 depicted in FIG. 12 had a central zone 31 in which the cross section of this transverse member had a closed profile and two lateral zones 32 and 33, respectively, in which Q the cross section of this transverse member 30 had an open profile.

The walls of this transverse member were 3 mm thick and the dimensions of the transverse member were as follows:

a: 60 mm
b: 60 mm
c: 30 mm
d: 60 mm
e: diameter 30 mm.

The dimensions a, b and c of the transverse member 30 were identical to the dimensions of the transverse member 10 according to the invention, and the mechanical properties of the steel were also identical.

The results obtained were as follows:

wheel side-slip: 86.2 mm
maximum point stress: 1280 MPa
maximum wide stress: 1280 MPa.

These results show that the stresses generated in a semi-closed transverse member are higher than those obtained in a transverse member according to this invention. The stresses lie in the region of the rounded portions between the open zones and, the closed central zone 31, which is not the case with the transverse member 10 according to the invention.

Clearly, numerous modifications and variations of the present invention are possible in light of the above teachings. Thus, it is to be understood that, within the scope of the appended claims, the invention may be practiced otherwise than as specifically described herein.

What is claimed is:

1. Transverse member for a motor vehicle rear axle assembly with trailing arms, comprising:

a metal section piece having a continuous longitudinal opening extending along at least 80% of the length of the section piece; and a block of elastomeric material formed as a sheet fastened to the metal section piece at a position to close off a central part of the continuous longitudinal opening, said sheet having a cross section in a shape of a quadrilateral.

2. Transverse member according to claim 1, wherein the sheet has a U-shaped cross section.

3. Transverse member according to claim 1, wherein the sheet has vertical side edges.

4. Transverse member according to claim 1, wherein the sheet has parallel and inclined side edges.

5. Transverse member according to claim 1, wherein the elastomeric material of the sheet has a Young's modulus between 200 and 500 MPa.

* * * * *